US008840323B2

(12) United States Patent
McColloch (10) Patent No.: US 8,840,323 B2
(45) Date of Patent: Sep. 23, 2014

(54) THERMALLY COMPENSATED PARALLEL OPTICAL COMMUNICATION MODULE

(75) Inventor: Laurence R. McColloch, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/594,957

(22) Filed: Aug. 27, 2012

(65) Prior Publication Data

US 2014/0056591 A1 Feb. 27, 2014

(51) Int. Cl.
*G02B 6/36* (2006.01)

(52) U.S. Cl.
USPC .......................................................... 385/93

(58) Field of Classification Search
CPC ............................... G02B 6/42; G02B 6/4269
USPC ..................................................... 385/88–94
See application file for complete search history.

(56) References Cited

U.S. PATENT DOCUMENTS

| 5,146,367 | A | 9/1992 | Newman | |
|---|---|---|---|---|
| 6,320,257 | B1 * | 11/2001 | Jayaraj et al. | 257/723 |
| 2002/0034834 | A1 | 3/2002 | Verdiell | |
| 2008/0095506 | A1 * | 4/2008 | McColloch | 385/89 |
| 2012/0020655 | A1 | 1/2012 | Pao | |

FOREIGN PATENT DOCUMENTS

EP 0932113 A2 7/1999

OTHER PUBLICATIONS

Ho, et al., "Ultralow-Cost Optical Transceiver Modules Based on Leadframe Plastic-Package Technology," 2005 Electronic Components and Technology Conference, IEEE, pp. 1032-1038.

* cited by examiner

*Primary Examiner* — Mark Robinson
*Assistant Examiner* — Zachary A Nemtzow (57) ABSTRACT

In a parallel optical communication module, an array of opto-electronic devices secured with respect to a mount and an array of optical elements of an optical device that is also secured with respect to the mount are unconstrained against relative movement due to thermal expansion of the mount and optical device. The mount and optical device can be made of materials having similar coefficients of thermal expansion. As thermal expansion in the mount causes the opto-electronic devices to move, similar thermal expansion in the optical device causes the optical elements to move to a similar extent. This co-movement of the opto-electronic devices and optical elements to similar extents promotes continued maintenance of optical alignment between opto-electronic elements and corresponding optical elements.

20 Claims, 9 Drawing Sheets

THERMALLY COMPENSATED PARALLEL OPTICAL COMMUNICATION MODULE

BACKGROUND

In an optical communication system, it is generally necessary to couple an optical fiber to an opto-electronic transmitter, receiver or transceiver device and to, in turn, couple the device to an electronic system such as a switching system or processing system. These connections can be facilitated by modularizing the transceiver device. Such optical transceiver modules include a housing in which are mounted opto-electronic elements, optical elements, and electronic elements, such as one or more light sources (e.g., lasers), light sensors (e.g., photodiodes), lenses and other optics, digital signal driver and receiver circuits, etc. In addition, a transceiver module typically includes an optical connector that can be coupled to a mating connector at the end of a fiber-optic cable. Various optical transceiver module configurations are known. For example, an optical transceiver module having an elongated housing with a rectangular cross-sectional shape, where the rear of the module plugs into a bay of a front-panel cage and the front of the module accepts an optical fiber plug, is commonly referred to as Small Form-Factor Pluggable or SFP.

Figure 1A:
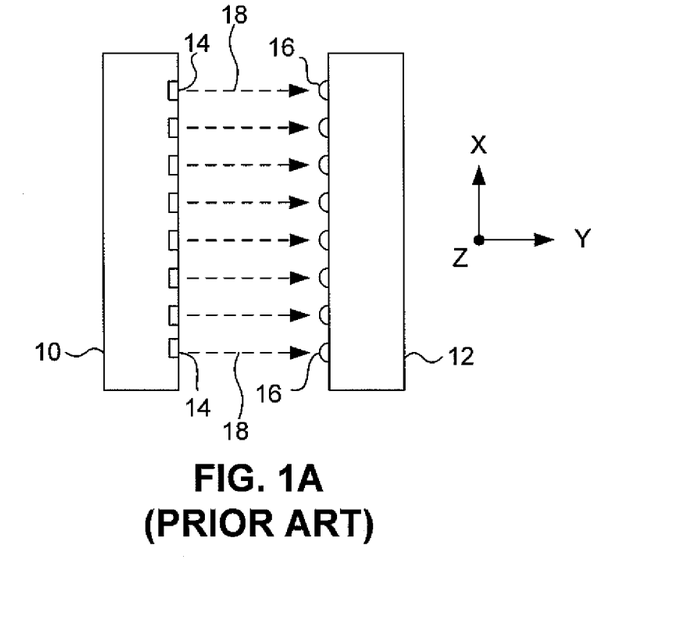
FIG. 1A is a schematic illustration of a parallel laser chip aligned with a lens array, in accordance with the prior art.
Figure 1B:
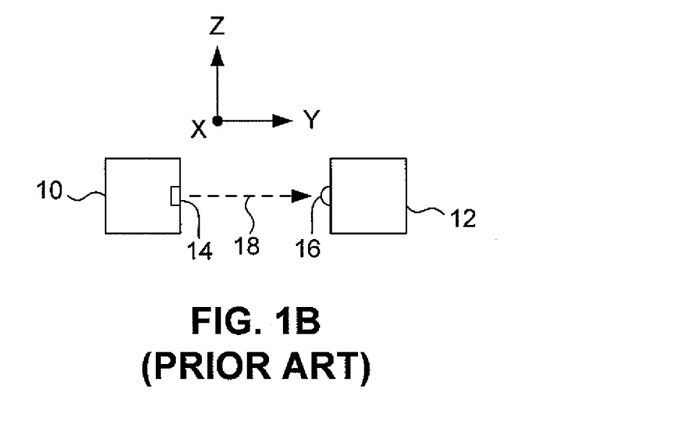
FIG. 1B is similar to FIG. 1A, showing the parallel laser chip and lens array from a different direction than FIG. 1A.

An optical transceiver module or other optical communication module that has a plurality of similar opto-electronic devices that are operable in parallel, such as a plurality of lasers or a plurality of photodiodes, is commonly referred to as a parallel optical communication module. Differential thermal expansion among the opto-electronic elements (e.g., lasers or photodiodes), substrates, lenses, lens mounts, and other elements in the optical signal paths can impair proper module operation. More specifically, in response to an increase in temperature, elements in the optical signal path that are made of materials having different coefficients of thermal expansion (CTE) move different amounts with respect to each other. For example, as illustrated in FIGS. 1A-B with respect to a three-axis (x, y, z) frame of reference (also known as a Cartesian coordinate system), a monolithic parallel laser chip 10 having a gallium arsenide or similar substrate can expand and contract to a different extent in the x-axis direction than a parallel plastic lens array 12 in which each laser 14 of chip 10 is intended to be optically aligned with one of the lenses 16 of lens array 12 to define an optical signal (beam) path 18. If such differential expansion occurs, any given one of the lasers 14 and the corresponding one of lenses 16 can become misaligned, i.e., no longer aligned on the intended optical signal path 18, from each other. To inhibit the detrimental effects of differential thermal expansion, such elements are commonly made of materials having as similar CTEs to each other as possible. For example, modules having gallium arsenide laser chips commonly include glass or quartz lens arrays rather than plastic lens arrays because the CTEs of glass and quartz are closer to the CTE of gallium arsenide than the CTE of plastic is to the CTE of gallium arsenide. However, it would be desirable to use plastic lenses instead of glass or quartz lenses because plastic lenses are more economical than glass or quartz lenses.

SUMMARY

Embodiments of the present invention relate to a parallel optical communication module and method of operation. In an exemplary embodiment, a parallel optical communication module includes a module housing, an electronic circuitry assembly within the module housing, a mount within the module housing, a plurality of monolithic opto-electronic devices arrayed along an axis and secured with respect to the mount, a plurality of flexible electrical conductors electrically connecting each opto-electronic device to the electronic circuitry assembly, and an optics assembly disposed within the module housing and coupleable to a plurality of optical fibers. Each opto-electronic device, which can be either a light source or a light sensor, includes a plurality of opto-electronic elements. These opto-electronic elements are thus arrayed along the axis. Each opto-electronic device is unconstrained against thermal expansion movement along the axis relative to others of the opto-electronic devices. The optics assembly comprises one or more optical devices. Each optical device comprises a plurality of optical elements correspondingly arrayed with respect to the axis along which the opto-electronic elements are arrayed. The optical device is secured with respect to the mount in a manner that secures each optical element in nominal alignment with a corresponding one of the opto-electronic elements along an optical path.

In an exemplary embodiment, a method of operation of the above-referenced parallel optical communication module comprises activating one or more of the opto-electronic devices via a plurality of flexible electrical conductors electrically connecting the one or more opto-electronic devices to the electronic circuitry assembly, and one or more of the opto-electronic devices experiencing movement along the axis relative to others of the plurality of opto-electronic devices in response to thermal expansion of the mount, while one or more of the optical elements also experience movement along the axis relative to others of the plurality of optical elements in response to thermal expansion of the optical device, wherein a plurality of the opto-electronic elements of each opto-electronic device are arrayed along the axis, and a plurality of optical elements of the optical device are correspondingly arrayed with respect to the axis along which the opto-electronic elements are arrayed.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 2:
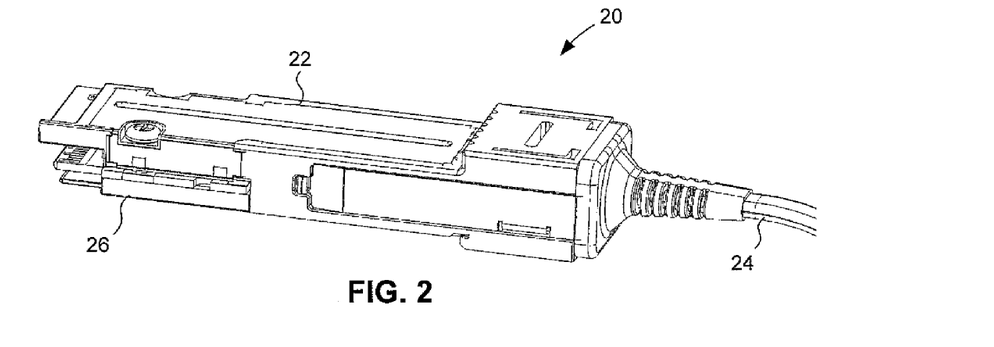
FIG. 2 is a perspective view of a parallel optical transceiver module, in accordance with an exemplary embodiment of the invention.
Figure 3:
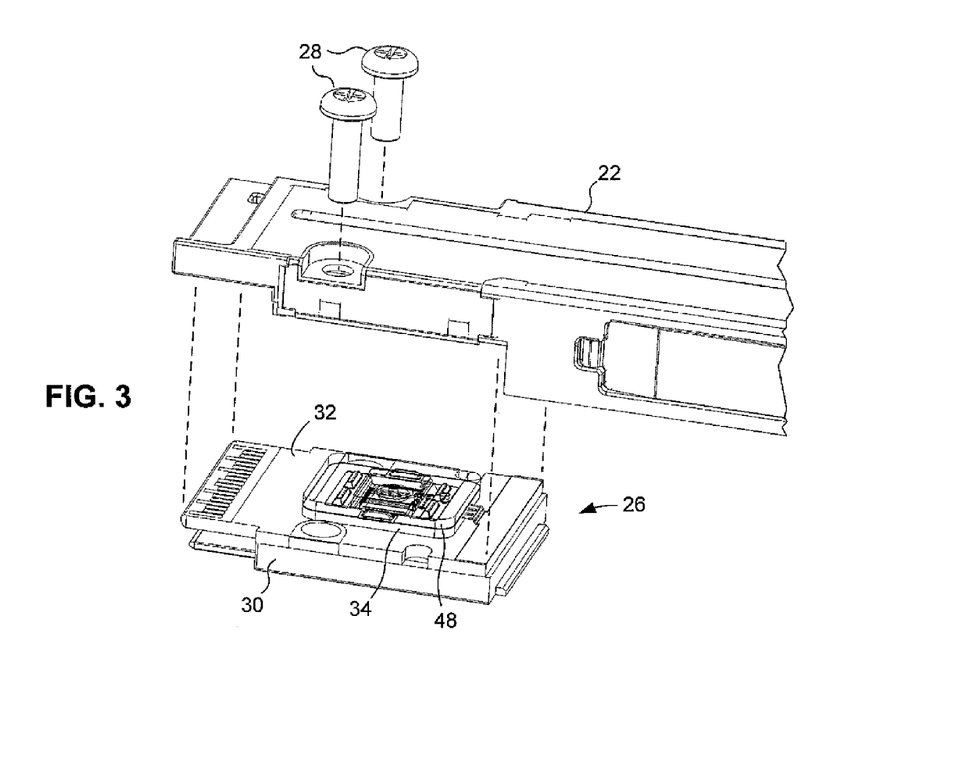
FIG. 3 is a partially exploded view similar to FIG. 2, showing the transceiver assembly and housing.

As illustrated in FIGS. 2 and 3, in an illustrative or exemplary embodiment of the invention, an optical transceiver module 20 comprises or includes an elongated housing 22, a fiber-optic cable 24, and a transceiver assembly 26. Transceiver assembly 26 is retained in the bottom of housing 22 by screws 28. Housing 22, in addition to covering and protecting electronic, opto-electronic and optical elements housed within it, is largely made of die-cast or stamped metal and serves as a heat sink to dissipate heat generated by the operation of the electronic and opto-electronic elements. As described below, transceiver elements are thermally compensated to minimize adverse effects of thermal expansion. Although in the exemplary embodiment elements of optical transceiver module 20 are thermally compensated as described below, in other embodiments (not shown) elements of an optical transmitter module or an optical receiver module can be thermally compensated in essentially the same manner as described.

Figure 4:
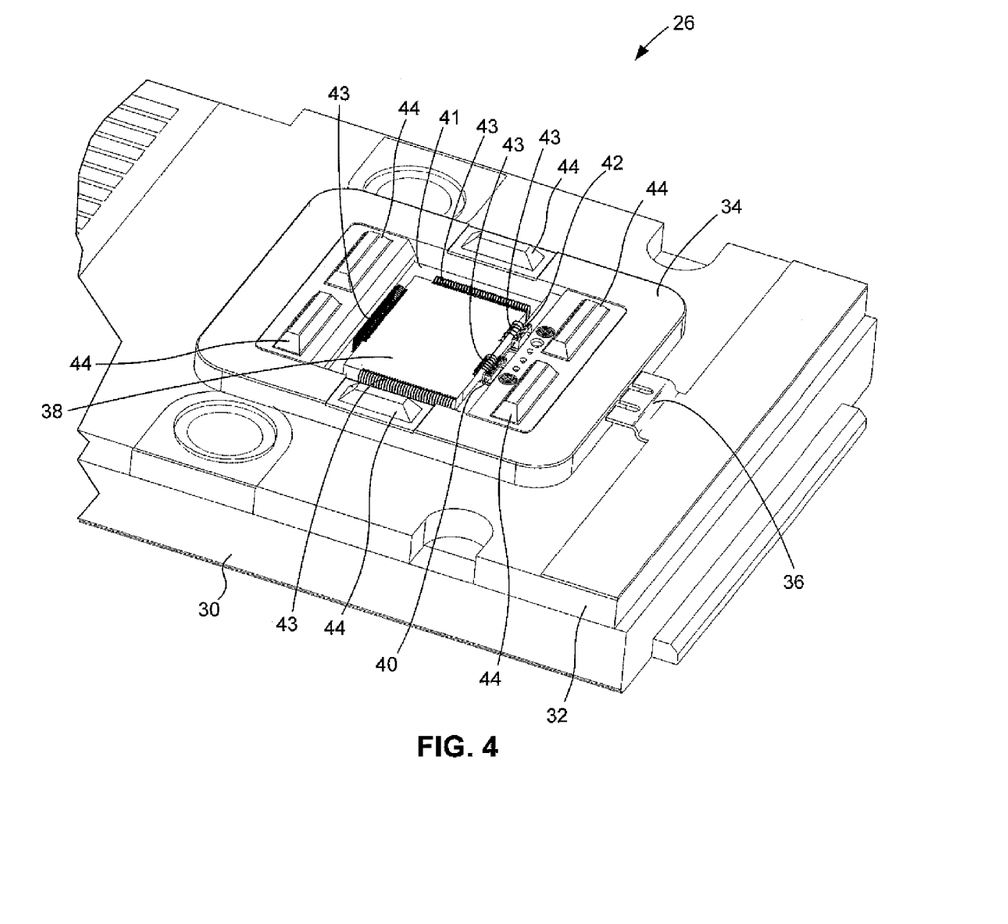
FIG. 4 is an enlarged perspective view of the transceiver assembly of FIG. 3, with the collimating lens device removed for clarity.
Figure 10:
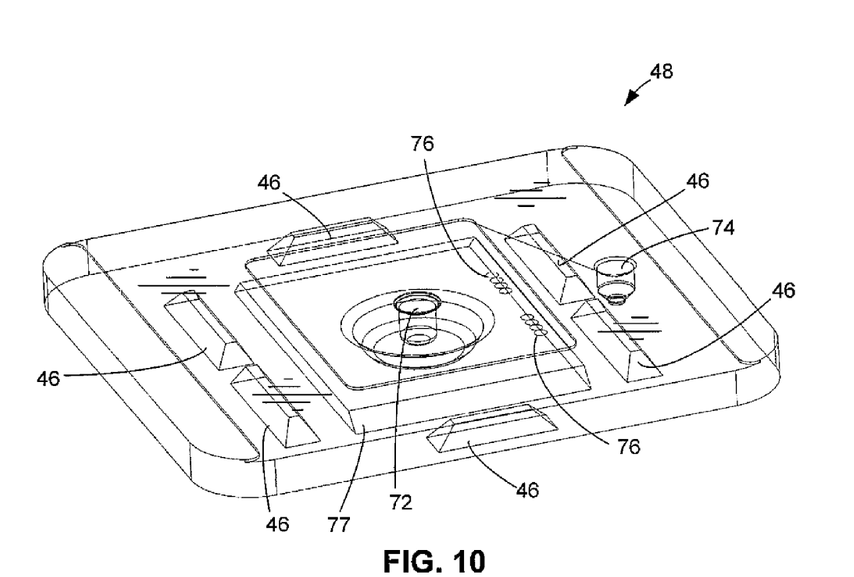
FIG. 10 is a top perspective view of the transparent collimating lens device of the assemblies of FIGS. 7-8.

As further illustrated in FIG. 4, transceiver assembly 26 includes a base 30, a printed circuit board (PCB) 32, a mount 34, a thermal conductor structure 36, a controller integrated circuit chip 38, a light source 40, and a light sensor 42. Mount 34 is mounted on the surface of PCB 32, which is in turn mounted on the surface of base 30. Mount 34 is a four-sided structure having an open central region 41 enclosed on the four sides by other portions of mount 34. Controller integrated circuit chip 38 is mounted on a region of PCB 32 within central region 41 of mount 34. Wirebonds 43 electrically connect controller integrated circuit chip 38 to PCB 32, light source 40 and light sensor 42. The upper surface of mount 34 includes pyramidal bosses 44 that mate with correspondingly shaped recesses 46 (FIG. 10) in the lower surface of a collimating lens device 48 (FIG. 10) that fits on top of or covers mount 34 in the manner described below.

Figure 5:
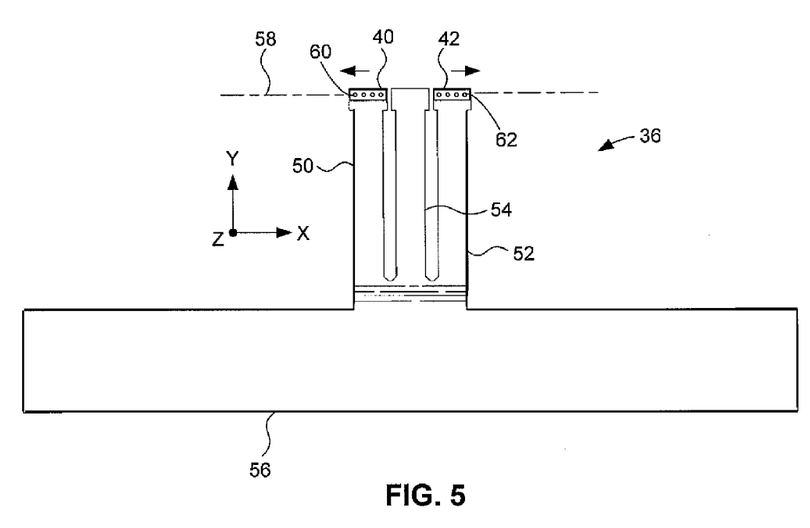
FIG. 5 is a plan view of thermal conductors of the transceiver assembly of FIGS. 3-4.

As illustrated in FIG. 5, thermal conductor structure 36 comprises a first finger-like elongated thermal conductor 50, a second finger-like elongated thermal conductor 52, and a third finger-like elongated thermal conductor 54, each parallel to the others. Light source 40 is mounted on a distal end of first elongated thermal conductor 50, and light sensor 42 is mounted on a distal end of second elongated thermal conductor 52. Third elongated thermal conductor 54 has nothing mounted on its distal end in the exemplary embodiment but serves to illustrate that there can be any number of such elongated thermal conductors. In other embodiments (not shown), any number of light sources, light sensors or other opto-electronic devices can be mounted on the distal ends of any corresponding number of such elongated thermal conductors. The proximal ends of thermal conductors 50, 52 and 54 terminate in a common base portion 56 of thermal conductor structure 36 that is perpendicular to thermal conductors 50, 52 and 54.

In the exemplary embodiment, light source 40 and light sensor 42 are arrayed along an axis 58. In a three-axis (x, y, z) frame of reference, axis 58 is aligned with the x axis, and thermal conductors 50, 52 and 54 extend or are elongated in a direction aligned with the y axis and perpendicular to the x and z axes. Although in the exemplary embodiment thermal conductors 50, 52 and 54 are relatively straight, i.e., they have no substantial deviations in the y-axis or z-axis directions, in other embodiments such thermal conductors can have any other suitable shape. For example, although the thermal conductors have an overall shape that is elongated in the x-axis direction, the thermal conductors can have portions along their length that, for example, curve, zig-zag, dog-leg, etc., and thus extend off the x-axis direction in directions having y-axis or z-axis components. (The term "length" in this context refers to the overall extent of elongation of a thermal conductor in the y-axis direction.) In the exemplary embodiment, thermal conductors 50 and 52 extend from base portion 56 to their distal ends on which light source 40 and light sensor 42 are respectively mounted. It should also be noted that although in the exemplary embodiment thermal conductors 50, 52 and 54 are flat, strip-like regions of metal, in other embodiments such thermal conductors can have other forms.

Light source 40 is a monolithic semiconductor device having an array of light-emitting elements 60. Similarly, light sensor 42 is a monolithic semiconductor device having an array of light-receiving elements 62. For example, light source 40 can comprise a 1×4 array of (i.e., a one-dimensional array of four) vertical cavity surface-emitting lasers (VCSELs). Similarly, light sensor 42 can comprise a 1×4 array of photodiodes. As light source 40 and light sensor 42 are mounted on thermal conductors 50 and 52, the heat that light source 40 and light sensor 42 generate in operation is conducted away by thermal conductors 50 and 52 to base portion 56. In the fully assembled optical transceiver module 20 (FIG. 1), base portion 56 is in contact with portions of housing 22, which conducts heat away from base portion 56 and thus serves as a heat sink. Although in the exemplary embodiment the opto-electronic devices include light source 40 having a 1×4 array of light-emitting elements 60 and light sensor 42 having a 1×4 array of light-receiving elements 62, other embodiments can include any other type and number of opto-electronic devices. For example, another embodiment (not shown) can include four monolithic light sources arrayed along an axis, each light source having a 1×4 array of light-emitting elements (e.g., VCSELs).

Figure 6:
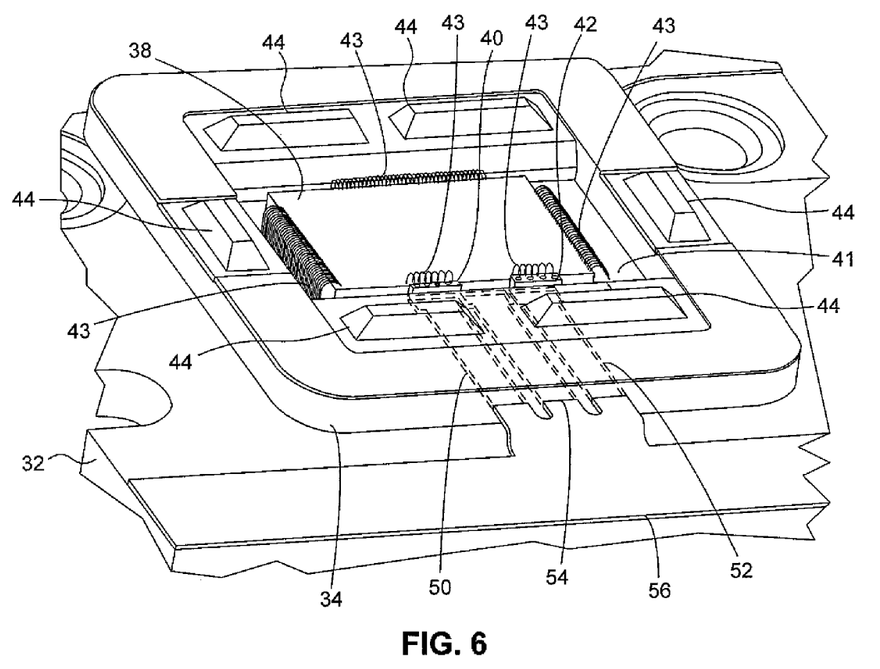
FIG. 6 is similar to FIG. 4, showing portions of the thermal conductors embedded in the mount.

As further illustrated in FIG. 6, portions of parallel thermal conductors 50, 52 and 54 are embedded within the plastic material of which mount 34 is made and are bordered or separated from one another by parallel regions of such plastic material. Although in the exemplary embodiment thermal conductors 50, 52 and 54 are embedded (except for their distal ends) entirely within mount 34, in other embodiments (not shown) such thermal conductors can be secured with respect to such a mount in any other suitable manner. For example, in other embodiments portions of such thermal conductors can remain exposed or outside the plastic material. Thermal conductors 50, 52 and 54 are secured with respect to mount 34 in the sense that they are held captive in mount 34 and therefore cannot move with respect to mount 34, except for movement due to thermal expansion of portions of mount 34. Referring again to FIG. 5, light source 40 and light sensor 42 move along with portions of mount 34 in the directions indicated by the arrows as those portions of mount 34 expand with an increase in temperature (and correspondingly contract with a decrease in temperature, although arrows indicating the opposite directions are not shown in FIG. 5 for purposes of clarity). As used herein, the term "thermal expansion" includes within its scope of meaning both expansion and contraction.

As illustrated in FIGS. 7-10, an optics assembly 64 includes collimating lens device 48 in combination with a fiber focusing device 66. Collimating lens device 48 covers or mounts onto the upper surface of mount 34. Fiber focusing device 66 is mounted on the upper surface of collimating lens device 48. To facilitate this mounting, the lower surface of fiber focusing device 66 includes bosses 68 and 70 (FIG. 9) that mate with correspondingly shaped recesses 72 and 74 (FIG. 10), respectively, in the upper surface of collimating lens device 48. Although in the exemplary embodiment the optical devices of optics assembly 64 include a collimating lens device 48 in combination with fiber focusing device 66, in other embodiments (not shown) such an optics assembly can include any other number and type of optical devices.

Figure 7:
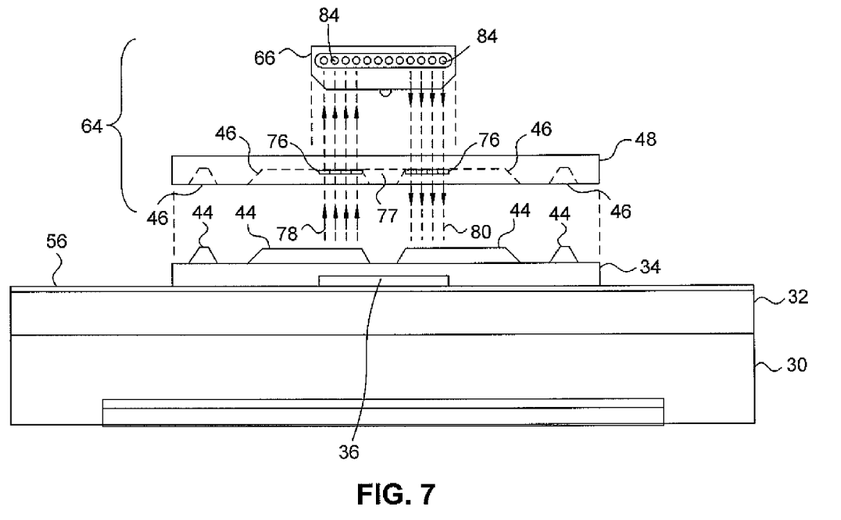
FIG. 7 is a partially exploded elevation view of the transceiver assembly of FIGS. 3-6 and an optical device, showing portions of the optical paths.
Figure 8:
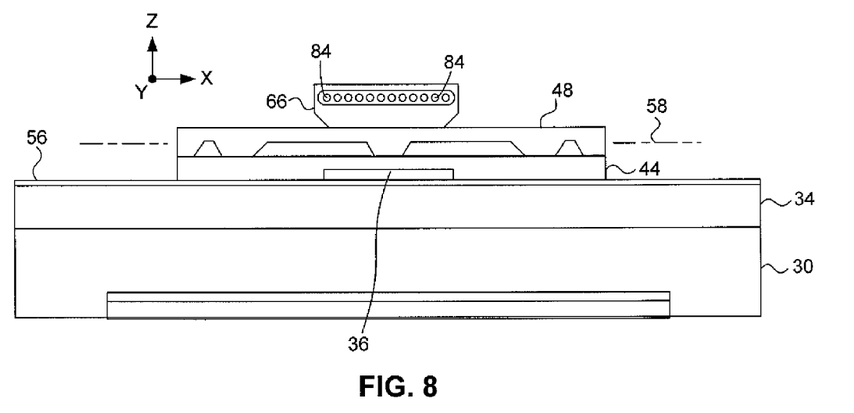
FIG. 8 is an elevation view similar to FIG. 7.
Figure 9:
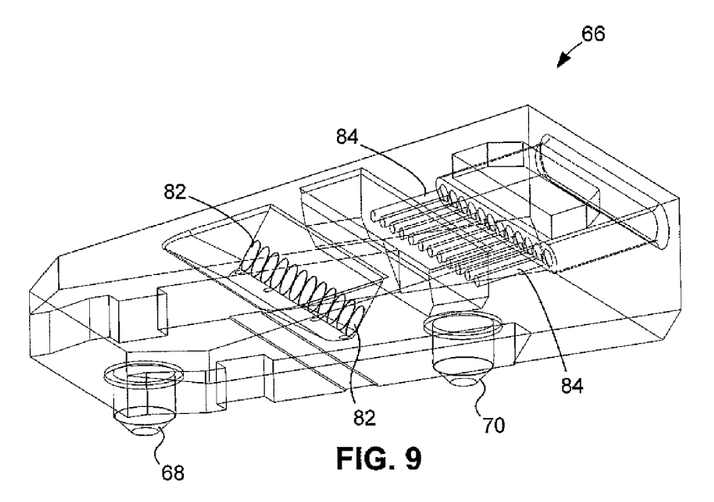
FIG. 9 is a perspective view of the transparent fiber focusing device of the assemblies of FIGS. 7-8.

Collimating lens device 48 includes two 1×4 arrays of collimating lenses 76 (FIGS. 7 and 10) formed in a recess 77 in the underside of collimating lens device 48. Collimating lenses 76 of one of these arrays are disposed along corresponding optical paths 78 (FIG. 7). Corresponding ones of light-emitting elements 60 (FIG. 5) emit optical signals (i.e., beams) on optical paths 78. Similarly, collimating lenses 76 of the other of array are disposed along corresponding optical paths 80 (FIG. 7). Corresponding ones of light-sensing elements 62 (FIG. 5) receive optical signals (i.e., beams) on optical paths 80. For purposes of clarity, optical paths 78 and 80 are indicated in FIG. 7 in a conceptual manner (indicated by broken line) rather than in a geometric manner. Accordingly, changes in direction in optical paths 78 and 80 are not indicated in FIG. 7 for purposes of clarity.

Fiber focusing device 66 includes reflective elements 82 (FIG. 9) that redirect the beams from one portion of optical path 78 to another portion and from one portion of optical path 80 to another portion. Fiber focusing device 66 also includes bores 84 that retain the ends of the optical fibers (not separately shown) of fiber-optic cable 24 (FIG. 1). Thus, beams emitted by light-emitting elements 60 of light source 40 are collimated by collimating lenses 76 and redirected by reflective elements 82 onto the fiber ends retained in bores 84. The four light-emitting elements 60, a first group of four collimating lenses 76, a first group of four reflective elements 82, and a first group of four bores 84 are all aligned along optical paths 78. Similarly, beams emitted by fiber ends retained in bores 84 are redirected by reflective elements 82 and collimated by collimating lenses 76 before impinging upon light-receiving elements 62 of light sensor 42. The four light-receiving elements 62, a second group of four collimating lenses 76, a second group of four reflective elements 82, and a second group of four bores 84 are all aligned along optical paths 80. Although in the exemplary embodiment the optical elements include collimating lenses 76, reflective elements 82, and the ends of bores 84, in other embodiments the one or more optical devices can include any other type of one or more optical elements.

The above-described optical devices are secured with respect to mount 34 in a manner that secures each optical element in nominal alignment with a corresponding one of the opto-electronic elements along optical paths 78 and 80. The term "nominal alignment" as used herein means that the elements are in alignment but for the undesired effects of thermal expansion that tend to bring these elements out of alignment.

Figure 11:
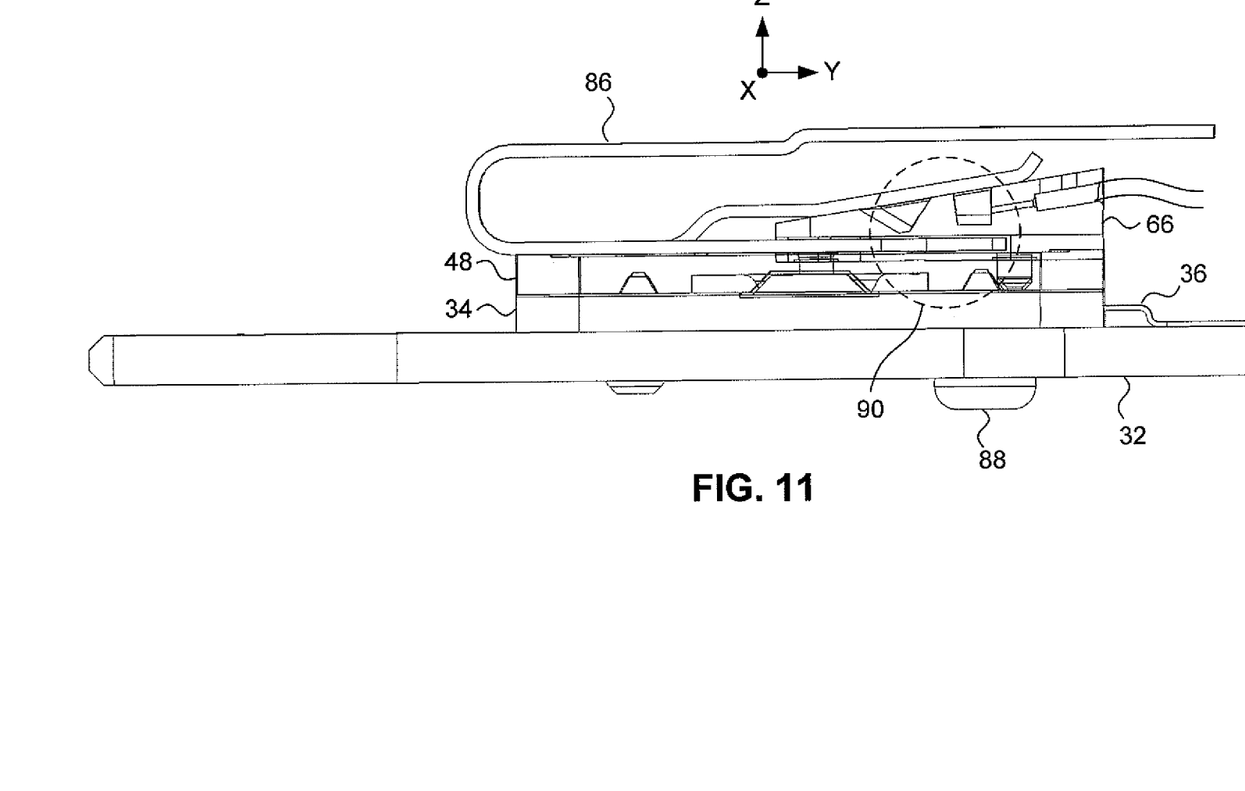
FIG. 11 is another elevation view of a portion of the assembly of FIG. 8 and a spring clip.
Figure 12:
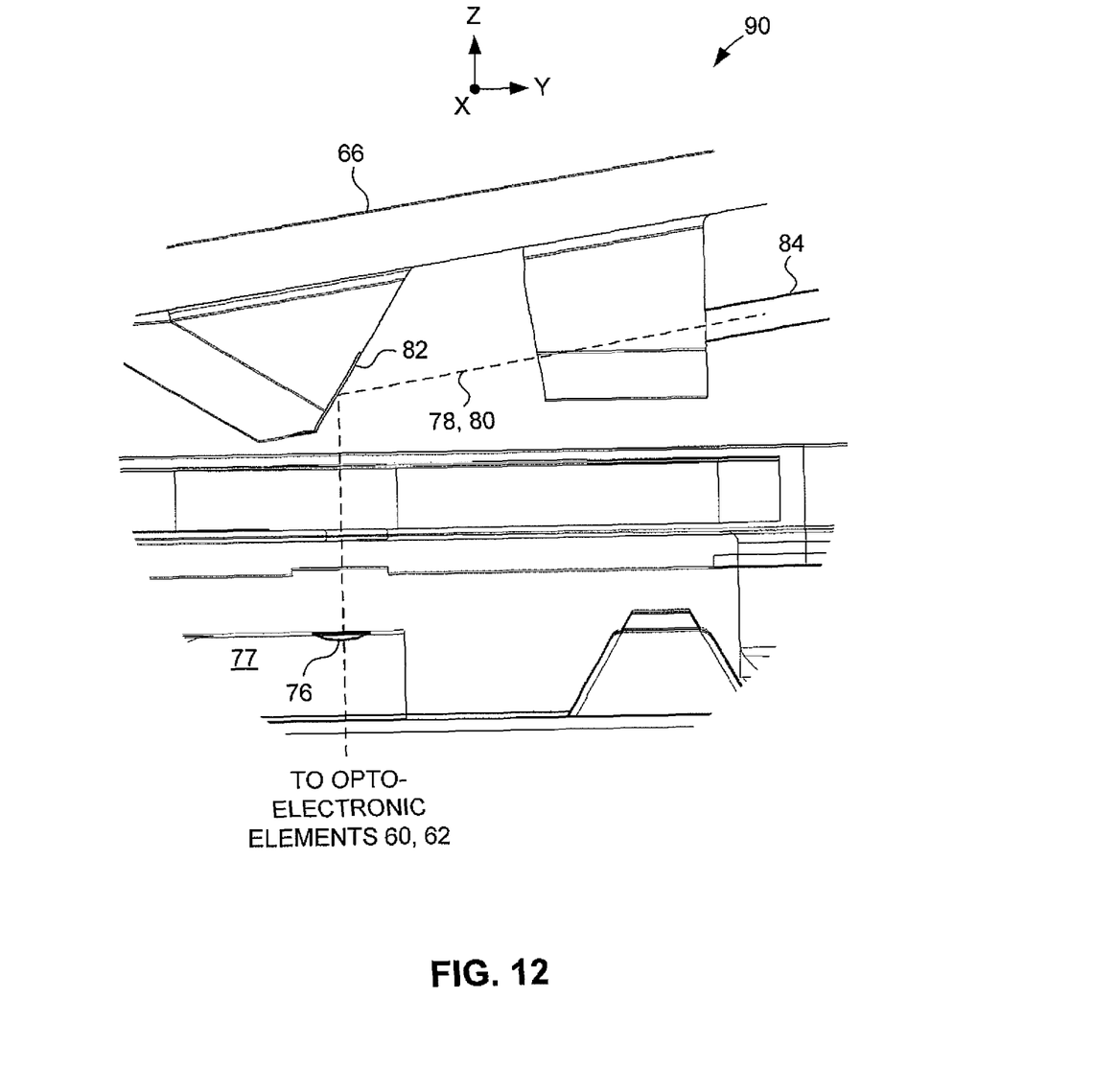
FIG. 12 is an enlargement of a portion of FIG. 11, showing optical paths.

The operation of the above-described elements in relation to optical paths 78 and 80 is further illustrated with regard to FIGS. 11-12. An assembly comprising PCB 32, mount 34, collimating lens device 48 and fiber focusing device 66 is shown in FIG. 11. A spring clip 86 helps retain these elements securely within housing 22 (FIGS. 2-3).

A boss 88 secures mount 34 to PCB 32. Boss 88 is positioned substantially in the center of mount 34 with respect to the x-axis, and the portions of mount 34 to either side of boss 88 (with respect to the x-axis) are not secured to PCB 32 in any way. That is, the portions of mount 34 to either side of boss 88 (with respect to the x-axis) float on the surface of PCB 32. Mount 34 is thus secured to PCB 32 by boss 88 at essentially single point with respect to the x-axis. Accordingly, portions of mount 34 to a "left" side of that point with respect to the x-axis are free to thermally expand leftward away from that point, and portions of mount 34 to a "right" side of that point with respect to the x-axis are free to thermally expand rightward away from that point. Note that the terms "left" and "right" are used in this context only to conveniently denote opposite directions and correspond to the arrows in FIG. 5.

For clarity, an enlarged portion 90 of FIG. 11 is shown in FIG. 12. The assembly shown in FIG. 11 is thermally compensated. In the exemplary embodiment, mount 34, collimating lens device 48 and fiber focusing device 66 are made of the same plastic material as each other, and each is molded as a single or unitary piece or mass of plastic material, such that its above-described optical elements are unitarily formed together with all other portions of the optical device. This plastic material has a certain coefficient of thermal expansion (CTE). In other embodiments, such optical devices can be made of plastic or similarly economical materials having CTEs that are not exactly the same but close to each other. As the plastic material of which mount 34 is made expands in response to heat, thermal conductors 50, 52 and 54 are moved or displaced in the x-axis direction by the expansion of the plastic material in which they are embedded by an amount related to the CTE of the plastic material. Light source 40 and light sensor 42 (and their light-emitting element 60 and light-receiving elements 62, respectively) are moved or displaced along with thermal conductors 50 and 52 on which light source 40 and light sensor 42 are respectively mounted.

Thermal compensation is present because the plastic material of which collimating lens device 48 and fiber focusing device 66 are made expands to the same extent as the plastic material of which mount 34 is made, i.e., they expand by an amount related to the CTE of the plastic material. Note that collimating lens device 48 has a shape and size that are substantially similar to the shape and size of mount 34, and that collimating lenses 76 are substantially disposed at the same locations with respect to the x-axis as the corresponding ones of light-emitting elements 60 and light-receiving elements 62 with which they are optically aligned. Thus, collimating lenses 76 are moved or displaced with respect to the x-axis by an amount that is similar to the amount by which such corresponding light-emitting elements 60 and light-receiving elements are moved or displaced with respect to the x-axis. Similarly, reflective elements 82 and the ends of bores 84 are moved or displaced with respect to the x-axis by an amount that is similar to the amount by which the corresponding ones of light-emitting elements 60 and light-receiving elements with which they are optically aligned are moved or displaced with respect to the x-axis. This co-movement of opto-electronic devices and optical elements to similar extents promotes continued maintenance of optical alignment (along optical paths 78 and 80) between opto-electronic elements and corresponding optical elements.

It can be noted that opto-electronic light source 40 or opto-electronic light sensor 42, each of which is formed on a monolithic semiconductor (e.g., silicon, gallium arsenide, etc.) substrate, experiences significantly less thermal expansion than the above-described plastic optical devices because the CTE of such substrate material is much lower than the CTE of such plastic material. Stated another way, monolithic semiconductor devices do not expand (or contract) very much in comparison to plastic devices. Thus, the movement or displacement of the individual opto-electronic elements 60 (e.g., VCSELs) with respect to each other or the movement or displacement of the individual opto-electronic elements 62 (e.g., photodiodes) with respect to each other is significantly less than the movement or displacement of opto-electronic light source 40 as a whole or opto-electronic light sensor 42 as a whole. Thus, for example, in an embodiment (not shown) in which each opto-electronic device has only a single opto-electronic element (i.e., a 1×1 array), the above-described thermal compensation could maintain near-perfect optical alignment because the opto-electronic element would be moved or displaced to the same extent as the optical elements with which it is aligned. However, as the number of opto-electronic elements in a single opto-electronic device increases, the above-described thermal compensation becomes less effective at maintaining optical alignment between opto-electronic elements of the opto-electronic devices and optical elements of the optical devices. It has been found that the thermal compensation may be most useful in embodiments in which a monolithic opto-electronic device consists of at least about four but no more than about eight opto-electronic elements. As it is desirable to provide elements in quantities that are powers of two, four opto-electronic elements (i.e., a 1×4 array) or, alternatively, eight opto-electronic elements (i.e., a 1×8 array), is believed to be an optimal number of opto-electronic elements in a single monolithic opto-electronic device. Also, although the embodiments described herein involve arrays of elements having only one row (e.g., "1×N," where "1" is the number of rows, and N is the number of elements), other embodiments can involve arrays of elements having more than one row.

One or more illustrative embodiments of the invention have been described above. However, it is to be understood that the invention is defined by the appended claims and is not limited to the specific embodiments described.

What is claimed is:

1. A parallel optical communication module, comprising:
a module housing;
an electronic circuitry assembly within the module housing;
an optics mount within the module housing, the optics mount having a substantially planar lower surface and a substantially planar upper surface parallel to the substantially planar lower surface, a wall of the optics mount disposed between the substantially planar lower and upper surfaces and separating an interior region from an exterior region;
a plurality of substantially parallel elongated thermal conductors, each thermal conductor having a proximal end and a distal end, the proximal end extending beyond the wall and disposed in the exterior region and coupled to proximal ends of other thermal conductors of the plurality of substantially parallel elongated thermal conductors, the distal end extending beyond the wall and disposed within the interior region, each thermal conductor elongated in a direction parallel to the substantially planar lower and upper surfaces and extending through the wall of the optics mount and held captive in the wall of the optics mount;
a plurality of monolithic opto-electronic devices arrayed along an axis perpendicular to the plurality of substantially parallel elongated thermal conductors and parallel to the substantially planar lower and upper surfaces, each monolithic opto-electronic device selected from the group consisting of light source and light sensor, each opto-electronic device having a plurality of opto-electronic elements arrayed along the axis, each monolithic opto-electronic device mounted on the distal end of one of the plurality of substantially parallel elongated thermal conductors;
a plurality of flexible electrical conductors electrically connecting each opto-electronic device to the electronic circuitry assembly;
an optics assembly mounted on the substantially planar upper surface of the optics mount, the optics assembly comprising an optical device, the optics assembly disposed within the module housing and coupleable to a plurality of optical fibers, the optical device comprising a plurality of optical elements arrayed correspondingly to the opto-electronic elements with respect to the axis, the optical device secured through direct contact with the optics mount to secure each optical element in nominal alignment with a corresponding one of the opto-electronic elements along an optical path.

2. The parallel optical communication module of claim 1, wherein:
the optics mount is made of a material having a mount material coefficient of thermal expansion;
each opto-electronic device is made of a material having an opto-electronic device coefficient of thermal expansion; and
the optical device is made of a material having an optical device coefficient of thermal expansion closer to the mount material coefficient of thermal expansion than to the opto-electronic device coefficient of thermal expansion.

3. The parallel optical communication module of claim 1, wherein the plurality of substantially parallel elongated thermal conductors are embedded within a portion of the optics mount and separated from one another only by portions of the material of which the optics mount is made.

4. The parallel optical communication module of claim 3, wherein the substantially parallel elongated thermal conductors comprise metal fingers coupled through a thermal path to a heat sink.

5. The parallel optical communication module of claim 3, wherein the optics mount and the optical devices are made of the same material as each other.

6. The parallel optical communication module of claim 5, wherein the optics mount and the optical devices are made of a plastic material.

7. The parallel optical communication module of claim 1, wherein the plurality of optical elements comprise lenses unitarily formed in the optical device, the optical device mounted to the optics mount.

8. The parallel optical communication module of claim 1, wherein the substantially planar lower surface of the optics mount and the proximal ends of the parallel elongated thermal conductors are mounted to a surface of a substrate.

9. The parallel optical communication module of claim 8, wherein the optics mount comprises a rectangular frame around a controller chip of the electronic circuitry assembly, and the optical device comprises a lid enclosing the controller chip within a cavity defined on all sides by the substrate, the optics mount and the optical device.

10. The parallel optical communication module of claim 8, wherein the optics mount is secured to the substrate at a single point along the axis.

11. A method of operation in a parallel optical communication module comprising a module housing, an electronic circuitry assembly within the module housing, an optics mount within the module housing, a plurality of substantially parallel elongated thermal conductors, a plurality of monolithic opto-electronic devices arrayed along an axis perpendicular to the plurality of substantially parallel elongated thermal conductors and parallel to the substantially planar lower and upper surfaces, and an optics assembly comprising an optical device, the optics mount having a substantially planar lower surface and a substantially planar upper surface parallel to the substantially planar lower surface, a wall of the optics mount disposed between the substantially planar lower and upper surfaces and separating an interior region from an exterior region, each thermal conductor of the plurality of substantially parallel elongated thermal conductors having a proximal end and a distal end, the proximal end disposed in the exterior region and coupled to proximal ends of other thermal conductors of the plurality of substantially parallel elongated thermal conductors, the distal end disposed in the interior region, each thermal conductor elongated in a direction parallel to the substantially planar lower and upper surfaces and extending through the wall of the optics mount and held captive in the wall of the optics mount, each monolithic opto-electronic device mounted on the distal end of one of the thermal conductors, the optics assembly disposed within the module housing and coupled to a plurality of optical fibers, the optical device secured through direct contact with the optics mount to secure each optical element in nominal alignment with a corresponding one of the opto-electronic elements along an optical path, the method comprising:

activating one or more of the opto-electronic devices via a plurality of flexible electrical conductors electrically connecting the one or more opto-electronic devices to the electronic circuitry assembly;

one or more of the opto-electronic devices experiencing movement along the axis relative to others of the plurality of opto-electronic devices in response to one of the thermal conductors held captive in the wall of the optics mount experiencing thermal expansion of the optics mount, wherein a plurality of the opto-electronic elements of each opto-electronic device are arrayed along the axis;

one or more of the optical elements experiencing movement along the axis relative to others of the plurality of optical elements in response to thermal expansion of the optical device, wherein a plurality of optical elements of the optical device are arrayed correspondingly to the opto-electronic elements with respect to the axis.

12. The method of claim 11, wherein:

the optics mount is made of a material having a mount material coefficient of thermal expansion;

each opto-electronic device is made of a material having an opto-electronic device coefficient of thermal expansion; and the optical device is made of a material having an optical device coefficient of thermal expansion closer to the mount material coefficient of thermal expansion than to the opto-electronic device coefficient of thermal expansion.

13. The method of claim 11, wherein the plurality of substantially parallel elongated thermal conductors are embedded within a portion of the optics mount and separated from one another only by portions of the material of which the optics mount is made.

14. The method of claim 13, wherein the substantially parallel elongated thermal conductors comprise metal fingers coupled through a thermal path to a heat sink.

15. The method of claim 13, wherein the optics mount and the optical devices are made of the same material as each other.

16. The method of claim 15, wherein the optics mount and the optical devices are made of a plastic material.

17. The method of claim 11, wherein the plurality of optical elements comprise lenses unitarily formed in the optical device, the optical device mounted to the optics mount.

18. The method of claim 11, wherein the substantially planar lower surface of the optics mount and the proximal ends of the parallel elongated thermal conductors are mounted to a surface of a substrate.

19. The method of claim 18, wherein the optics mount comprises a rectangular frame around a controller chip of the electronic circuitry assembly, and the optical device comprises a lid enclosing the controller chip within a cavity defined on all sides by the substrate, the mount and the optical device.

20. The method of claim 18, wherein the optics mount is secured to the substrate at a single point along the axis.

* * * * *